E. JOHNSON

Sept. 27, 1932. MARINE TRACTOR Re. 18,610

Original Filed April 23, 1932

INVENTOR
Earle Johnson.
BY
Janney, Blair & Curtis
ATTORNEYS

Reissued Sept. 27, 1932

Re. 18,610

UNITED STATES PATENT OFFICE

EADS JOHNSON, OF MORRISTOWN, NEW JERSEY

DESIGN FOR A MARINE TRACTOR

Original No. 87,263, dated June 28, 1932, Serial No. 43,588, filed April 23, 1932, for 3½ years. Application for reissue filed August 2, 1932. Serial No. 44,539. Term of patent 14 years.

*To all whom it may concern:*

Be it known that I, EADS JOHNSON, a citizen of the United States, residing at Morristown, in the county of Morris and State of New Jersey, have invented a new, original, and ornamental Design for Marine Tractors, of which the following is a specification, reference being had to the accompanying drawing forming part thereof.

Figure 1:
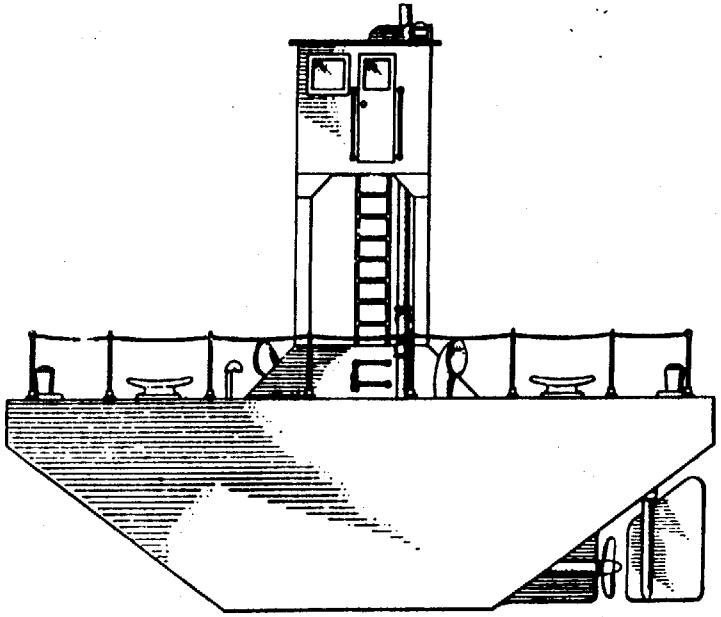

In the drawing, Fig. 1 is a side elevation of a marine tractor showing my new design.

Figure 2:
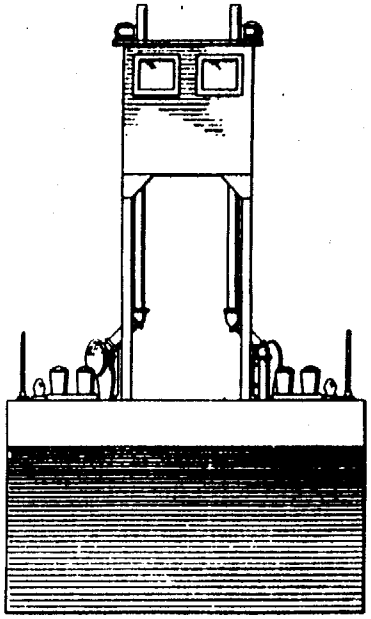

Fig. 2 is an end elevation of the same.

I claim:

The ornamental design for a marine tractor as shown.

EADS JOHNSON.